Sept. 14, 1926.  
C. H. HAPGOOD  
1,600,168  
SPRING TESTING MACHINE  
Filed Jan. 7, 1921 2 Sheets-Sheet 1
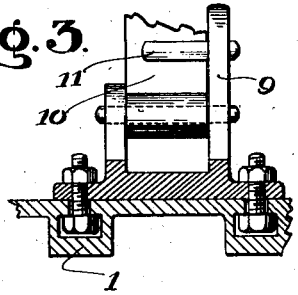
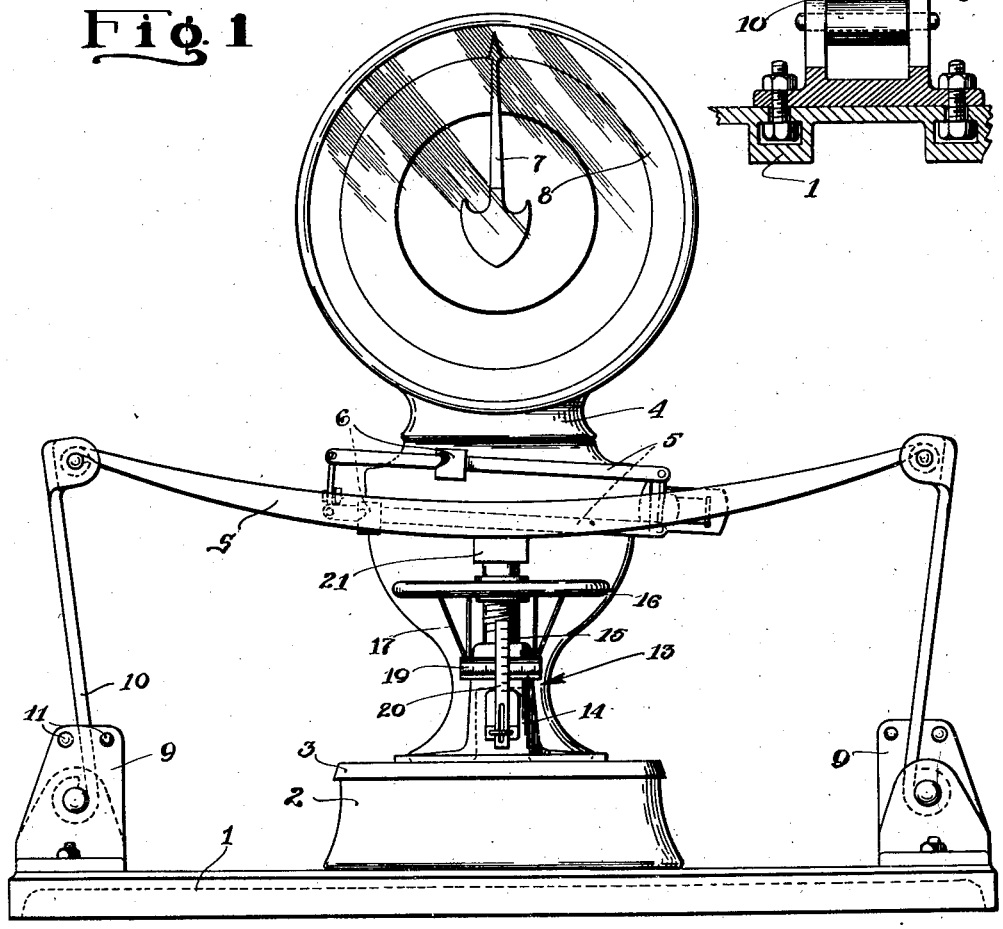
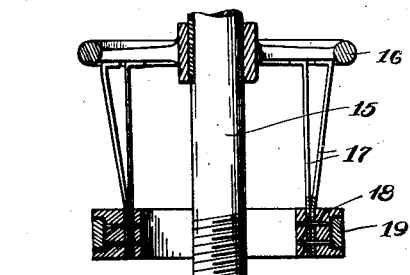
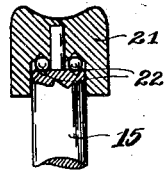
Inventor  
CLARENCE H. HAPGOOD.  
Witness  
C. E. Wilcox By  
C. C. Marshall  
Attorney Sept. 14, 1926.  
C. H. HAPGOOD  
1,600,168
SPRING TESTING MACHINE
Filed Jan. 7, 1921  2 Sheets-Sheet 2
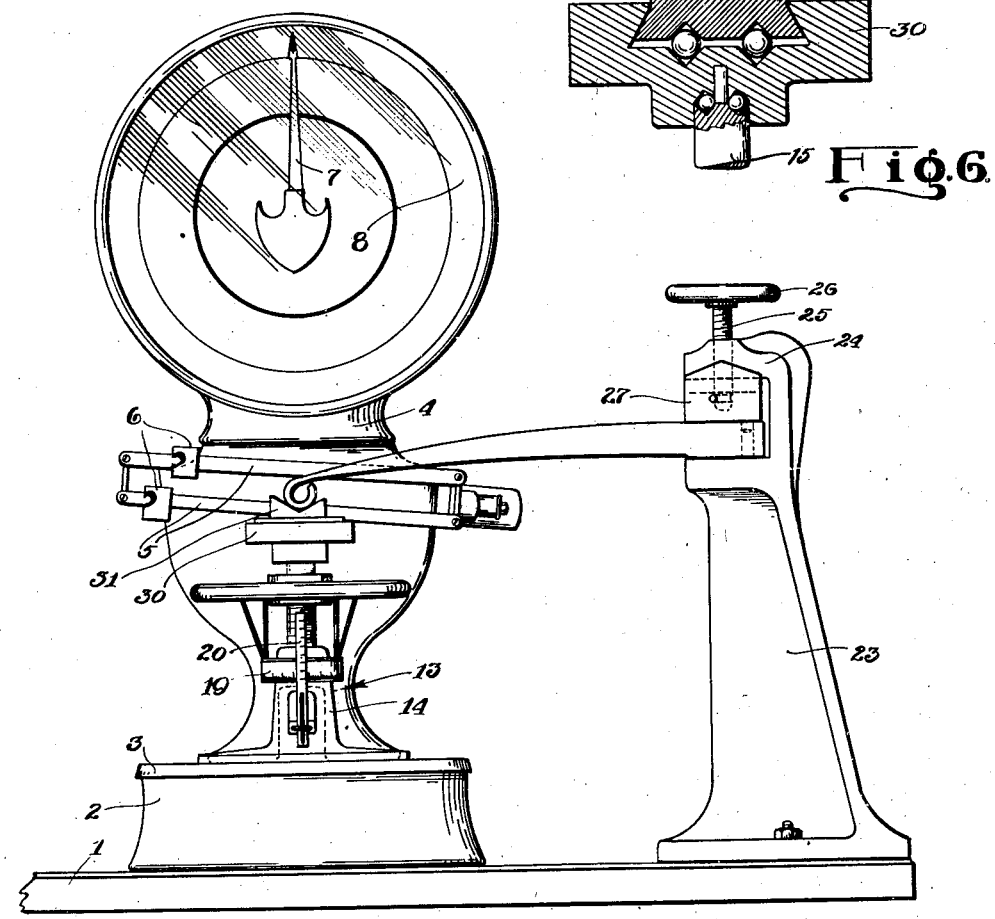
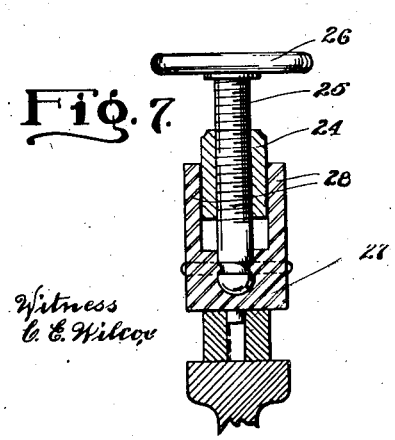
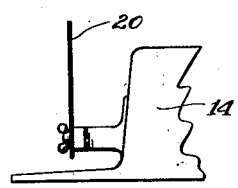
Witness  
C. E. Wilcox
Inventor  
CLARENCE H. HAPGOOD.
By C. C. Marshall  
Attorney Patented Sept. 14, 1926.

1,600,168

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

SPRING-TESTING MACHINE.

Application filed January 7, 1921. Serial No. 435,616.

This invention relates to testing machines, and particularly to machines for testing the flexibility of springs. When springs are employed in pairs or sets, it is often important that the resistance offered to any given degree of flexure or distortion be the same for each spring of the set. The amount of force required to bend to a given extent the springs employed in supporting automobile bodies sometimes varies several hundred pounds, even though the springs be identical in appearance. When the springs on opposite sides of the body are not equally resistant to flexure, unpleasant lateral movements occur in traveling over uneven roads, these movements sometimes being sufficiently violent to capsize the vehicle.

One of the objects of this invention is the provision of means for automatically determining the bending moment of a spring for any given degree of flexure.

Another object is to provide a spring testing device having adjustable means for indicating distortion and co-acting automatic means for indicating stress.

Another object is the provision of means for permitting free elongation of semi-elliptic or cantilever springs as they are bent in the testing machines.

Other objects and advantages will be apparent from the following description, in which reference is had to the accompanying drawings illustrating preferred embodiments of my invention and wherein similar reference numerals designate similar parts throughout the several views.

In the drawings:

Figure 1 is a front elevation of a spring testing machine embodying my invention arranged for testing semi-elliptic springs;

Figure 2 is a front elevation of the machine arranged for testing cantilever or quarter-elliptic springs, part of the base being broken away;

Figure 3 is an enlarged fragmentary view, partly in section, showing a bracket for pivotally attaching a semi-elliptic spring holder to the base;

Figure 4 is an enlarged sectional view of a hand wheel for turning a bending jack, showing a micrometer scale supporting ring attached thereto;

Figure 5 is a sectional view through a member rotatably mounted upon the upper end of the bending jack and adapted to engage the center of a semi-elliptic spring;

Figure 6 is a sectional view of a similar member adapted to engage the end of a quarter-elliptic spring;

Figure 7 is a vertical sectional view of the upper end of a stand adapted to support a quarter-elliptic spring, showing a clamp for holding one end of the spring rigid; and Figure 8 is a side elevation of a vertical scale showing the means whereby it is adjustably secured to the jack.

Referring to the drawings in detail, the base 1 supports an automatic scale preferably, though not necessarily, of the type shown and described in my co-pending application Ser. No. 367,207, filed March 19, 1920. Since any preferred form of automatic weighing scales may be employed in the testing device forming the subject matter of this application. I will describe the weighing scale only in such detail as will serve to show its relation to the rest of the combination. As illustrated, it consists of a base housing 2 with an overlying platform 3 supported upon suitable platform levers (not shown). At the rear end of the base housing is an upright housing 4 supporting the load-offsetting and indicating mechanism, which consists in part of one or more tare beams 5 and poises 6 and in part of automatic counterbalancing mechanism (not shown) connected to an indicator hand 7 which cooperates with a dial 8.

In the arrangement shown in Figure 1, a bracket 9 is bolted upon each end of the base 1, the heads of the bolts being placed in T-shaped grooves (as shown in Figure 3) so that the brackets may be adjusted laterally, and each bracket pivotally supports a link 10 which extends substantially vertically when in use. Stop lugs or pins 11 prevent the links 10 from falling to either side when not in use, thus holding them in position to be readily attached to the ends of semi-elliptic springs S to be tested. When a spring is thus attached to the ends of the links 10 its intermediate portion lies above the platform 3.

Mounted upon the platform 3 is a bending jack 13 which consists of a stand 14 into which is threaded a vertically extending jack screw 15 having a surrounding hand wheel 16 fixed thereon. The hand wheel 16 carries a plurality of depending brackets 17 to which is fixed a groove annulus 18 having a ring 19 mounted in the groove so that it may be manually rotated but is prevented by friction from turning accidentally. The ring 19 bears a micrometer scale which cooperates in the well-known manner with a unit scale on an upright 20 adjustably secured to the stand 14.

Upon the upper end of the jack screw 15 is a rotatably mounted cap 21 adapted, when the screw is turned up, to engage the lower side of the spring to be tested intermediate its ends, bearing balls 22 being interposed between the cap and the upper end of the screw to reduce friction. It will be apparent that when the cap 21 is held stationary, it provides a bearing for the rotation of the jack screw. The spring to be tested may be first placed upon the scale and the poise 6 moved out on the beam 5 a sufficient distance to bring the indicating hand 7 back to zero. The weight of the spring may, if desired, thus be counterbalanced on the beam and the hand and dial employed to indicate the net force required to flex the spring to any given degree. After being weighed and counterbalanced by the poise 6, the spring is attached to the links 10 with the convex side down. Since the spring is now supported by the links 10, the weight is removed from the platform and the hand 7 will drop back of zero. The jack screw is now turned up by means of the hand wheel until the cap 21 engages the spring and lifts it sufficiently to bring the indicator to zero, thus showing the weight of the spring to be supported by the jack on the scale platform and indicating that no bending stress has yet been applied. The upright 20 and the ring 19 are then adjusted to zero. By further turning up the screw the spring may be flexed to any desired degree, the amount of flexure in inches and fractions being shown respectively on the scales of the upright 20 and the ring 19 and the bending moment being automatically indicated on the dial by the position of the hand 7.

The elongation of the spring is permitted by the swinging movement of the links 10.

By the use of my testing device hidden defects in springs, as well as the characteristics of the usable springs, are made apparent, so that defective springs may be rejected or similar springs may be paired.

When my device is to be used for testing quarter-elliptic springs, one of the brackets 9 with its link 10 is removed and a rigid stand 23 is bolted to the base in its place. The stand 23 is provided with an overhanging arm 24 having a vertically-extending clamping screw 25 threaded therethrough. A hand wheel 26 is fixed to the upper end of the screw 25 and a clamping jaw 27 is swiveled to its lower end. The clamping jaw 27 has a pair of upright plates 28 which embrace the arm 24 so that the jaw is prevented from turning (see Figure 7). A short pin extends downwardly from the jaw to engage the bolt hole in the thick end of a quarter-elliptic spring when such a spring is clamped between the jaw 27 and the upper end of the stand 23.

Since the stand 23 is rigid, the elongation of the spring is taken care of at its other end. A cap 30 having a horizontally-slidable member 31 mounted in a groove in its upper face is substituted for the cap 21 upon the jack screw, bearing balls being interposed between the cap 30 and member 31 to reduce the friction to a minimum.

In testing a quarter-elliptic spring, the hand 7 is brought to zero by moving the poise 6 to counterbalance the extra weight of the cap 30. The spring is then clamped to the stand 23 and the jack screw is turned up until the member 31 engages, but does not stress, the loop on the end of the spring. The upright 20 and ring 19 are then set at zero. The jack screw is then further turned up to flex the spring to any desired degree, the amount of flexure being indicated on the upright 20 and ring 19 and the force required to bend the spring automatically indicated on the dial, as in the case of semi-elliptic springs.

As the pressure is put upon the scale platform it moves slightly downwardly so that for springs of different thicknesses the indication on the scale 20 is not an absolutely true indication of the amount of distortion of the spring. The difference is very slight, however, and when the scale is used in the manner described in the specification for sorting or classifying springs, springs of the same strength will give absolutely the same indication both on the dial of the scale and on the scale 20 and ring 19.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a device for testing leaf springs, in combination, means for bending a spring, including means connected to an end of such spring to permit longitudinal movement of such end, adjustable means for indicating the amount of flexure of such spring, and automatic means for indicating the corresponding bending moment.

2. In a device of the class described, in combination, a bending jack comprising a stand, a member having a scale thereon adjustably attached to said stand, a jack screw, and a scale-bearing ring adjustably attached to said jack screw.

3. In a device of the class described, in combination, means for offsetting the weight of a spring, counterbalancing means for bending said spring, means for indicating the extent of said bending, and means for indicating the net force required to bend said spring to the extent indicated.

4. In a device of the class described, in combination, a bending jack, means for indicating the extent of movement of said jack from any of a plurality of positions, and automatic load-indicating mechanism connected to said jack.

5. In a device of the class described, in combination, a frame member, a load-counterbalancing and indicating scale supported on said frame member, a bending jack re-acting upon said scale, and interchangeable holding means for different types of springs adapted to be selectively secured to said frame member.

6. In a device of the class described, in combination, a load-counterbalancing and indicating scale, a bending jack re-acting upon said scale, said jack including a jack screw, a cap swiveled upon the end of the jack screw, and a spring-engaging member slidably mounted on said cap.

7. In a device of the class described, in combination, a load-counterbalancing and indicating scale, a bending jack re-acting upon said scale, said bending jack including a jack screw, a cap rotatably mounted upon the end of said jack screw, ball bearings interposed between said cap and jack screw, a spring-engaging member slidably mounted on said cap, and ball bearings interposed between said spring-engaging member and said cap.

8. In a device of the class described, the combination of an automatic scale having a platform, a jack screw mounted on said platform, a spring-engaging member carried by said jack screw, and means for holding the ends of the springs, said spring-holding means being mounted adjacent the scale.

9. In a device of the class described, the combination of an automatic scale having a platform, a jack screw mounted on said platform, a spring-engaging member carried by said jack screw, and means for holding the ends of the springs, said spring-holding means being adjustably mounted adjacent the scale.

CLARENCE H. HAPGOOD.